United States Patent [19]

DiCarlo et al.

[11] Patent Number: 5,026,113
[45] Date of Patent: Jun. 25, 1991

[54] SLIDING AND VENTING SUNROOF

[75] Inventors: Leonard DiCarlo, Maryland Heights; Robert J. Reese, Saint Charles, both of Mo.

[73] Assignee: Sky-Top Sunroofs Ltd., St. Louis, Mo.

[21] Appl. No.: 242,686

[22] Filed: Sep. 9, 1988

[51] Int. Cl.⁵ .............................................. B60J 0/4
[52] U.S. Cl. ..................................... 296/221; 296/223
[58] Field of Search ............... 296/217, 220, 221, 222, 296/223, 219

[56] References Cited

U.S. PATENT DOCUMENTS

| | | | |
|---|---|---|---|
| 4,039,222 | 8/1977 | Wolf et al. | 296/216 |
| 4,220,900 | 9/1980 | Mintz | 318/266 |
| 4,333,680 | 6/1982 | Wolf et al. | 296/216 |
| 4,403,805 | 9/1983 | Strem, Jr. et al. | 296/223 X |
| 4,420,184 | 12/1983 | Kaltz | 296/222 |
| 4,629,953 | 12/1986 | Inoue et al. | 296/223 X |
| 4,650,243 | 3/1987 | Hanley et al. | 296/221 |
| 4,652,045 | 3/1987 | Hanley et al. | 296/221 |
| 4,671,565 | 6/1987 | Grimm et al. | 296/223 X |
| 4,732,422 | 3/1988 | Schlapp et al. | 296/223 X |
| 4,746,165 | 5/1988 | Fuerst et al. | 296/220 X |
| 4,749,227 | 6/1988 | Bienert et al. | 296/221 |
| 4,752,099 | 6/1988 | Roos et al. | 296/223 |

Primary Examiner—Charles A. Marmor
Assistant Examiner—Michael Mar
Attorney, Agent, or Firm—Sandler, Greenblum & Bernstein

[57] ABSTRACT

A sliding and venting sunroof includes a perforated tape drive system, an overlapping groove panel positioning device and a "one-touch" power sunroof control. The drive system uses a single gear to drive two tapes. The overlapping groove mechanism includes a fixed plate with a groove therein, a slidable plate with a groove therein, and a lift arm with a pin that can simultaneously ride in both grooves. The sunroof control does not allow sunroof closing in the absence of a continuous indication from an operator that the sunroof is to be closed, but allows full opening by instantaneous indication from an operator.

39 Claims, 11 Drawing Sheets

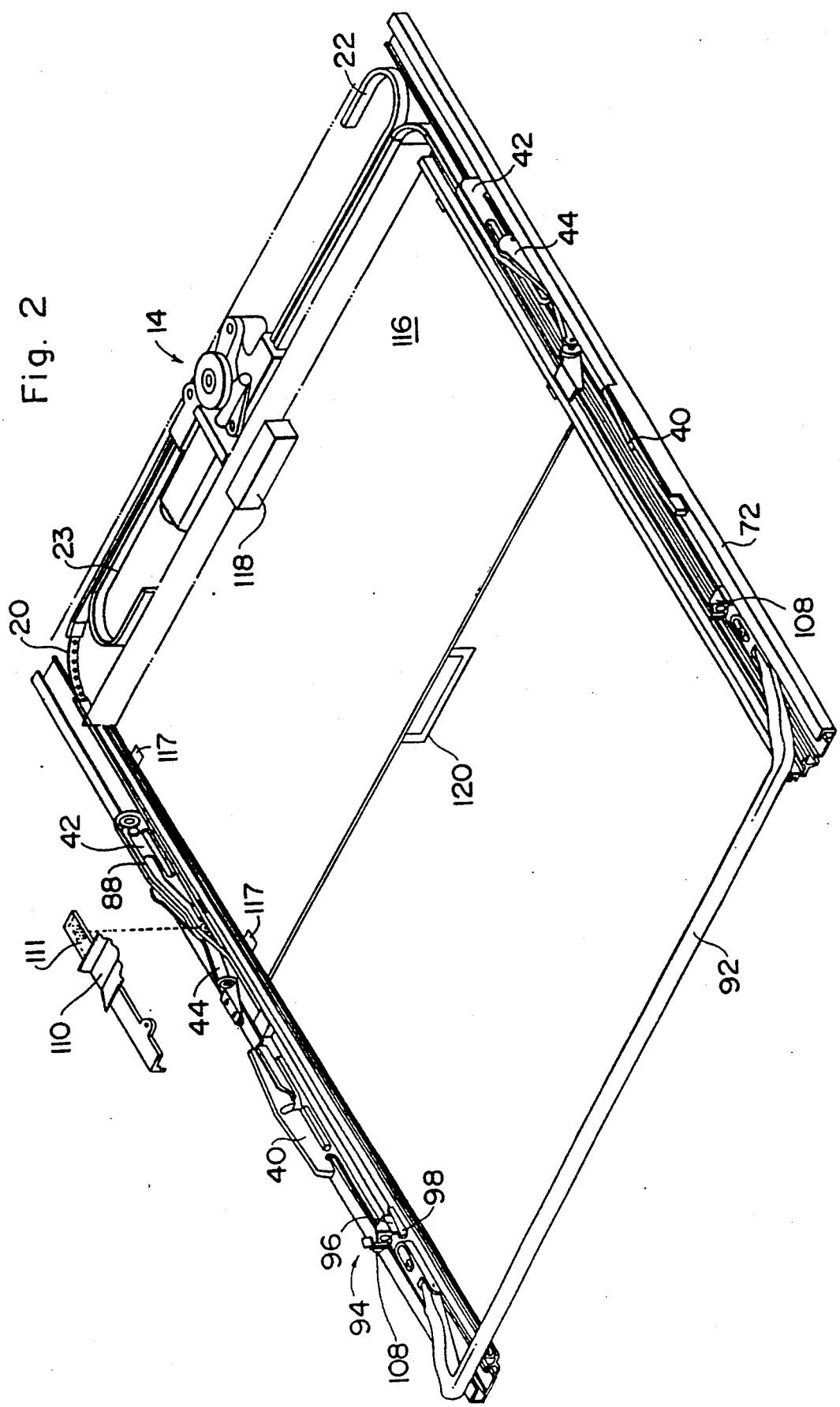

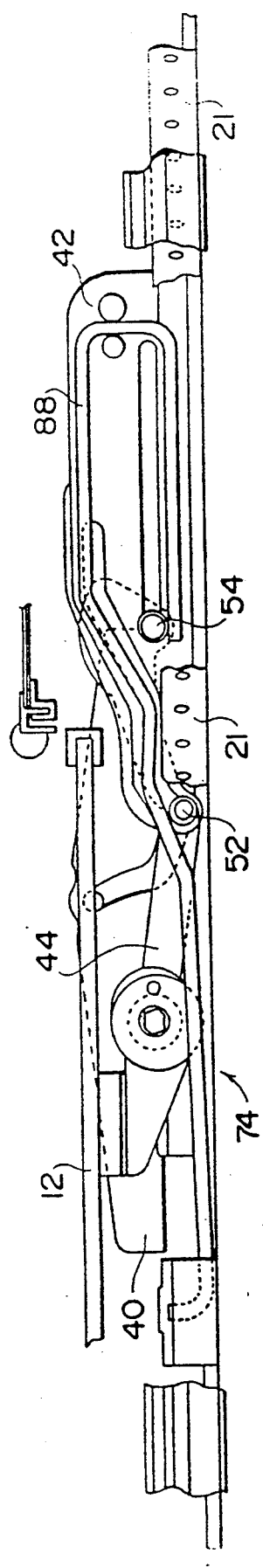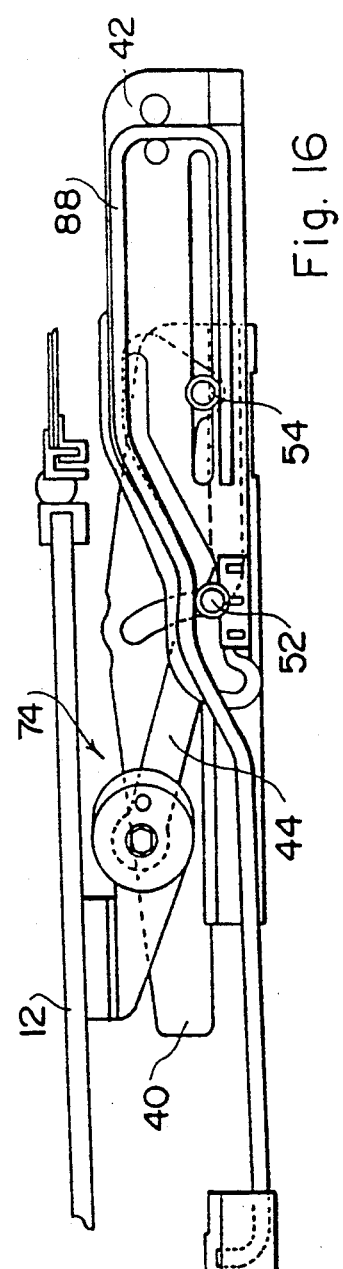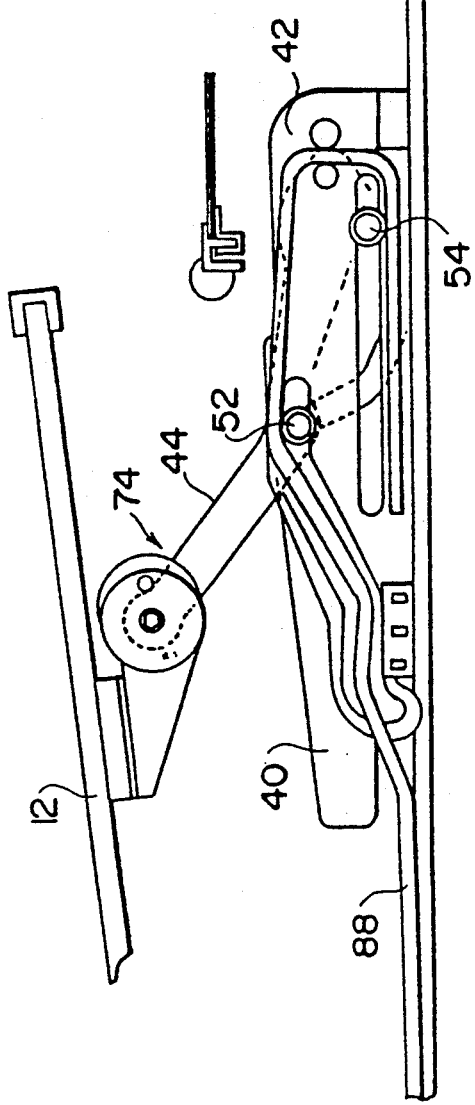

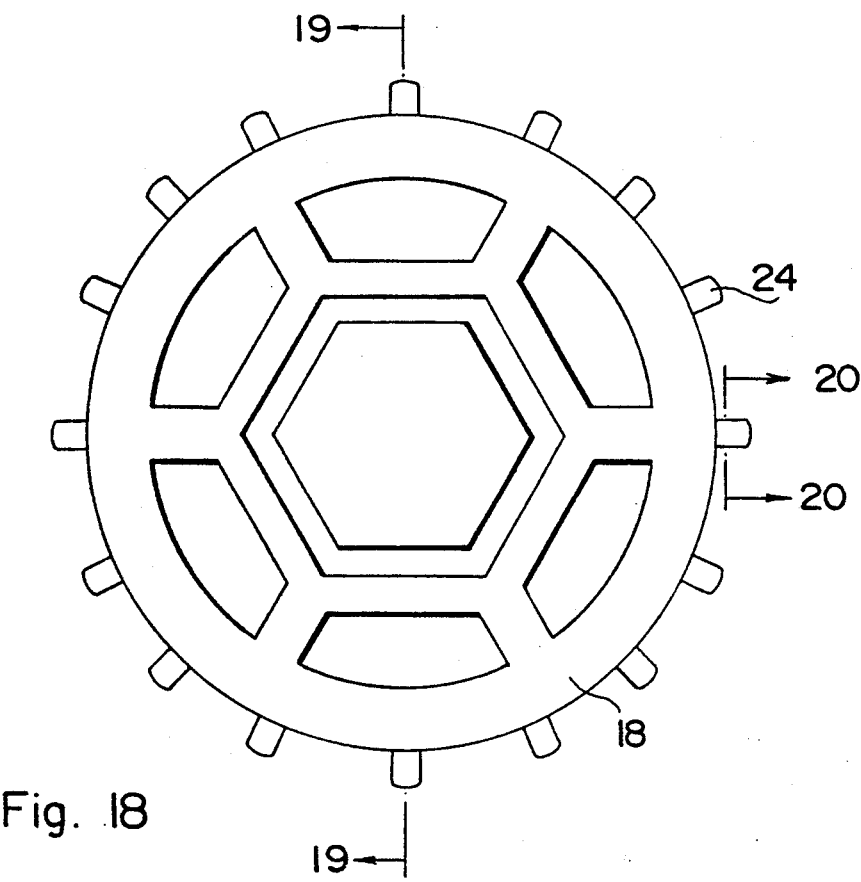
Fig. 18
Fig. 19
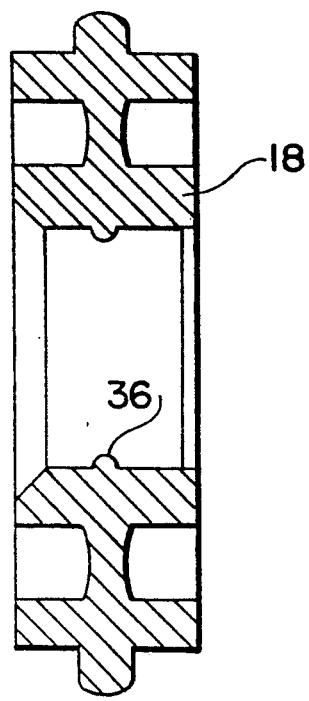
Fig. 20
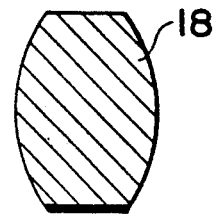

SLIDING AND VENTING SUNROOF

BACKGROUND OF THE INVENTION

1. Field of the Invention

The present invention relates to a roof structure and, more particularly, to a vehicle roof structure including a movable roof panel for opening and closing an opening in the roof of a vehicle.

2. Description of the Prior Art

A popular option in the automotive market is a roof vent more commonly referred to as a sunroof or, as it is called when a panel which forms part of the vent is made of a transparent material such as glass, a moonroof. A particularly popular type of roof vent is a sliding and venting sunroof. Such a sunroof has a movable roof panel which is slidable between closed and open positions in an opening formed in the roof of a vehicle as well as being pivotable about its front end to raise the rear edge of the roof panel a small amount above a stationary roof structure, i.e., into a "venting" position. Typically, the roof panel is formed of metal or glass. It is also common for sunroofs to be provided with electrically powered drive mechanisms which operate to move the movable roof panel. Examples of heretofore developed sliding and venting sunroofs may be seen in U.S. Pat. No. 4,420,184 to KALTZ and U.S. Pat. Nos. 4,650,243 and 4,652,045 to HANLEY et al.

There are a multitude of desired characteristics of sunroofs. Of course, it is desirable that sunroofs be reliable, easy to service and smooth and quiet in operation. Along this line, the fewer movable parts that make up the sunroof mechanism, generally the better. Also, with respect to smooth operation, it is important that drive mechanisms do not become unbalanced so as to cause the moving roof panel to be no longer positioned or stressed evenly on both sides. Certain prior art drive systems, especially those employing a drive cable, are prone to becoming unbalanced. Details regarding prior art cable drive systems are set forth in U.S. Pat. No. 4,749,227 to BIENERT et al. and in U.S. Pat. No. 4,752,099 to ROOS et al. In addition, it is important that sunroofs be safe. Along this line, sunroofs must remain fixed in their various positions notwithstanding the strong pressures applied on them from different directions. For example, sunroofs must remain closed even when car doors are slammed, compressing the air inside the vehicle and exerting a strong upward force on the sunroof. Also, it is important that sunroofs do not close when it is not intended that they close, otherwise a person (or object) in the way of the closing roof panel could become injured (or damaged). Yet another factor contributing to safety is the inclusion of shielding between the car interior and moving parts of the sunroof mechanism. Such shielding can also be designed to enhance the appearance of the sunroof, making it more attractive to potential purchasers and users. Further, it is desirable that sunroofs be quick and easy to install. This reduces the labor costs of becoming a sunroof owner, making the option more attractive to potential purchasers. Still further, because of the recent trend towards smaller and lighter weight vehicles, it is becoming increasingly important that sunroofs be compact and lightweight. Large sunroof mechanisms can dramatically reduce headroom in a vehicle; this can be a severe problem in a vehicle that already has very little headroom.

From the foregoing, it should be apparent that it is extremely difficult to design a sunroof that possesses all of the desired characteristics of sunroofs. In fact, an aspect of a sunroof that enhances the sunroof in one respect will very likely detract from the sunroof in another respect. For example, adding shielding for safety and appearance purposes increases size and weight which are undesirable in today's smaller cars. Likewise, adding locking mechanisms also increase weight and may increase mechanism size. Each part added to a sunroof for any reason makes the sunroof somewhat less reliable and more difficult to service. These types of trade-offs could be further set forth at length.

Accordingly, it should also be apparent that there is a continuing need for an improved sunroof, that is, a sunroof that has a maximum number of the desired characteristics set forth above, while having a minimum number of shortcomings, if any.

SUMMARY OF THE INVENTION

The present invention is directed to a new and improved pivotable-sliding roof panel apparatus for vehicles having an opening in their roofs.

In accordance with the present invention, the sunroof for a vehicle having an opening in its roof includes a sunroof track, a sunroof panel movably mounted on the track and drive means operably connected to the movable sunroof panel for causing selective movement of the movable sunroof panel. The sunroof according to the present invention may also include lifter means connected between the sunroof track and the sunroof panel for raising and lowering at least part of the sunroof panel.

In accordance with the present invention, the lifter means includes a stop plate mounted on the sunroof track and a slide plate slidably mounted on the sunroof track. The stop plate has portions defining a groove (a first groove), this first groove being, at least in part, inclined relative to the sunroof housing, which is generally horizontally disposed. Likewise, the slide plate has portions defining a groove (a second groove), this second groove being, at least in part, inclined relative to the generally horizontally disposed sunroof housing. The lift means further includes a lift arm pivotably attached to the slide plate and a pin (a first pin) attached to the lift arm. The first pin is adapted to slidingly ride in the second groove and is further adapted to be slidingly received and to slidingly ride in the first groove. The stop plate, slide plate, lift arm, and first pin cooperate to raise the roof panel into a venting position from a closed position of the sunroof and, operating in reverse, to lower the roof panel from a venting position into a closed position, and further lower the panel into an open position and raise the panel to the closed position.

In certain embodiments of the present invention, the slide plate has portions defining yet another groove (a third groove) and yet another pin (a second pin) is attached to the lift arm. The second pin is adapted to slidingly ride in the third groove.

Other important features of the present invention are incorporated into the drive means. One such feature is that the motor, which forms part of the drive means, is mounted to the rear of the sunroof mechanism. This rear mounting of the motor allows mounting of the sunroof farther forward on a vehicle roof so as to enhance the open air effect of the sunroof. Yet another feature is that the drive system does not use a cable.

Instead, the drive system uses a perforated tape adapted to cooperate with moving projections so as to move smoothly, quietly, and in balance.

Still other important features of the present invention reside in the design of and favorable benefits provided by a front glider assembly which forms part of the sunroof mechanism. The front glider assembly (or assemblies, as generally two are provided, one on each side of the sunroof panel, generally disposed toward the front of the sunroof panel) includes a U-shaped bracket with pads attached to the sides of the U-shaped bracket. The U-shaped bracket is adapted to slide in a track formed into or attached to the sunroof housing and the pads may include integral springs to take up any clearance between the pads and the track. The front ends of the glider pads may be rounded and the rear ends of the glider pads may be relieved so that the pads are capable of pivoting or rotating in the track. The U-shaped bracket may straddle an upwardly biased wind deflector arm mounted on the sunroof housing.

Yet other important features of the present invention reside in the design of and favorable benefits provided by a rear adjuster assembly This assembly (or assemblies, as there are frequently two in a single sunroof mechanism) is designed to allow easy vertical adjustment inside the vehicle and to allow lateral adjustments so that the sunroof panel can be properly positioned in the roof opening. These favorable benefits are achieved by using a disk with the lift arm assembly attached eccentrically from the center of rotation of the disk. Since the disk is loaded against a rear adjuster bracket, the disk acts as a clutch. A preset spring force, which may be produced by a spring washer on the back of the rear adjuster bracket, can be constructed to require a small torque to rotate the disk but not to allow the disk to rotate when a large load is placed on the corner of the sunroof panel supported by the rear adjuster assembly. This is because of the short length of the moment on which the large load can act. Thus, a lift adjuster in the rear of the sunroof panel can allow vertical panel adjustment without the need of loosening a hold-down fastener. Also, the mechanism can act to pull the sunroof panel rearward to compensate for forward motion of the front edge of the panel that occurs because the front pivot point cannot be exactly at the front edge of the panel, when operated into the vent position.

Additional important features of the present invention reside in aspects that contribute to safe operation of the sunroof. The sunroof may include limit switches mounted on the stop plate. In such a position, these limit switches are protected from the environment outside the vehicle. These limit switches may be activated by magnets carried by the front glider assembly and slide plate. So activated, physical contact between moving components is rendered unnecessary. This increases durability of the unit. Further, having limit switches mounted on the stop plate (or plates, for as with the front glider assembly and numerous other elements of the present invention, there are likely to be two such elements mounted on the two sides of the sunroof), adjustment of position of the sunroof can be easily accomplished by adjusting position of the stop plate or plates. Movement of multiple elements are not required to vary the position of the sunroof panel. Another very important feature of the present invention is that the present invention includes, or may include, a switch that allows for closing only when the switch is continuously engaged by an operator. If, for example, the switch is released, sunroof closing operation ceases. Opening of the sunroof, on the other hand, may be automatic upon one push of a switch. Movement of the sunroof panel from a closed to a venting position requires continued operator engagement. All of the foregoing operations may be incorporated into a "one touch" circuit that is activated via a user-controlled switch such as a rocker switch or a push button switch. With the sunroof closed, pressing and releasing the switch to a "open" position can cause the roof panel to move rearward automatically so as to open. The panel may continue to open until it either reaches its fully open position and trips a limit switch or until the switch is depressed into either an "open" or "close" position. If the panel is stopped before reaching a limit switch, it may be activated again by pressing the switch into either the "open" or "close" position as desired. Once the open or vent limit switch has been tripped, no further movement in the same direction is possible. Pressing and holding the switch into a "close" position causes the panel to move forward so as to close. The panel may continue to close until it either reaches its fully closed position or until the switch is released Once the panel is fully closed, pressing the switch toward the "close" position again may actuate the venting function. Here, the rear panel edge may move upward, pivoting on the front panel edge, and tripping a vent limit switch. The panel can be returned to the closed position by pressing the switch to the "open" position. If the switch is held depressed in the "open" position at this point, the unit may pause for two seconds (in the closed position) and continue opening and pause for two seconds when going from open through closed to vent.

Still yet further important features of the present invention reside in the possible use of down-flanged trim to provide a standard, ready-made opening for the sunroof panel, the use of which could be expected to significantly reduce installation time.

Still further important features of the present invention reside in the fact that the mechanism track may serve as a base for the entire assembly. This track could even serve as the sunroof housing. Thus, both size and weight of the sunroof of the present invention may be minimized.

According to the teachings of the present invention, an assembly for moving a cover with respect to an opening includes a housing, means for movably mounting the cover on the housing, means for causing selective movement of the cover, and means for raising and lowering at least part of the cover. Further according to the teachings of the present invention, the means for raising and lowering includes a stop plate mounted on the track, the stop plate having portions defining a first guide; a slide plate slidably mounted on the track, the slide plate having portions defining a second guide; a lift arm pivotally attached to the slide plate and operatively connected to the cover; and a first elongate element attached to the lift arm and adapted to slidingly ride in the first guide and in the second guide.

In an assembly according to the present invention, the housing may be disposed in a plane or have a curved configuration. In the former instance the first guide may have a portion inclined relative to the plane, and the second guide may have a portion inclined relative to the plane. In the latter instance where the housing has a curved configuration, the inclined portions are inclined with respect to a line of curvature of the housing, and preferably a longitudinal line of curvature of the housing. For example, the roofs of vehicles in which a sunroof is mounted are typically curved and the housing of the assembly in accordance with the present invention would be constructed to have a curved configuration to correspond to the curve of the roof of the vehicle. The first guide may be a slot having an open first end for receiving the first elongate element and a closed second end. The second guide may be a groove having a closed first end and a closed second end. The slide plate may have portions defining a third guide. In embodiments where there is a third guide, an assembly according to the present invention may also include a second elongate element attached to the lift arm and adapted to slidingly ride in the third guide. The third guide may have a longitudinal axis which is substantially parallel to the plane.

An assembly according to the present invention may also include a clutch mechanism connected between the cover and the lift arm to provide adjustments.

In an assembly according to the present invention, means for causing selective movement of the cover may include at least one perforated tape operatively connected to the cover, a motor associated with the assembly having an output shaft, and a gear mounted on the output shaft, the gear having teeth adapted to engage the at least one perforated tape. An assembly according to the present invention may also include means for controlling the motor. This means for controlling the motor may include an integrated circuit chip responsive to both pulse input signals and continuous input signals.

In an assembly according to the present invention, the cover may be a sunroof panel and the opening may be in the top of a vehicle.

According to the teachings of the present invention, a mechanism for moving a sunroof panel with respect to a fixed sunroof housing, the sunroof housing having portions defining a track, includes a stop plate mounted on the track, the stop plate having portions defining a first guide; a slide plate slidably mounted in the track of the housing, the slide plate having portions defining a second guide; a lift arm attached to the sunroof panel and pivotally attached to the slide plate; and a first elongate element mounted on the lift arm, the first elongate element having portions projecting into the first guide and portions adaptable to project into the second guide so that the first elongate element can track the first guide and the second guide during sliding movement of the slide plate. The first guide may have an open end and a closed end and, further, the second guide may have one closed end and another closed end. The one closed end of the second guide may constitute a notch for engaging the first elongate element. The notch may be adjacent to the track of the housing. The second guide may further include a first plateau portion having a first end, a second end, and a longitudinal axis generally parallel to the track of the housing. The second guide may further include a first ramp portion interconnecting the notch and the first end of the first plateau portion. The second guide may further include a second plateau portion having a first end and a longitudinal axis generally parallel to the track of the housing and disposed further from the track of the housing than the longitudinal axis of the first plateau portion. The second guide may further include a second ramp portion interconnecting the second end of the first plateau portion and the first end of the second plateau portion.

According to the teachings of the present invention, the stop plate may include means for arresting sliding movement of the slide plate at a predetermined location. The means for arresting sliding movement may include the closed end of the first guide. The means for arresting sliding movement may further include the portions of the first elongate element adaptable to project into the first guide.

According to the teachings of the present invention, the stop plate may further include means for disengaging the first elongate element from the notch. The means for disengaging the first elongate element from the notch may include portions of the stop plate which define part of the first guide. The means for disengaging the first elongate element from the notch may include portions of the stop plate which define an intermediate ramp section of the first guide. The intermediate ramp section may have a proximal end and a distal end, the proximal end being disposed farther from the closed end of the stop plate than the distal end and, further, the proximal end of the intermediate ramp section may connect to a horizontal section of the first guide, which horizontal section of the first guide is defined by portions of the stop plate. The second end of the intermediate ramp section connects to an elliptically curved section of the first guide, which elliptically curved section of the first guide is defined by portions of the stop plate.

In embodiments of the present invention, the slide plate may have portions defining a third guide having a closed first end and a closed second end.

In certain embodiments of the present invention, the track of the sunroof housing may have a longitudinal axis and, further, the third groove may have a longitudinal axis that is generally parallel to the longitudinal axis of the track of the sunroof housing.

Certain embodiments of the present invention may include a second elongate element mounted on the lift arm, the second elongate element having portions projecting through the second guide so that the second elongate element can track the third groove during sliding movement of the slide plate and so that the lift arm can pivot with respect to the slide plate around the second elongate element.

Embodiments of the present invention may include means for suppressing sideways movement of the slide plate in the track of the housing. The means for suppressing sideways movement of the slide plate in the track of the sunroof housing may include a lash spring. Embodiments of the present invention including a lash spring may also include means for holding the lash spring in position, the means for holding the lash spring in position comprising the second elongate element.

Embodiments of the present invention may include means for suppressing movement of the lift arm towards and away from the slide plate. The means for suppressing movement of the lift arm toward and away from the slide plate may include the lash spring.

According to the teachings of the present invention, a sunroof for a vehicle having an opening in its roof includes a sunroof housing having portions defining a track having edges, a sunroof panel, and means for movably mounting the sunroof panel on the sunroof housing. Further according to the teachings of the present invention, the means for movably mounting including a first glider assembly, and a rear adjuster assembly. The front glider assembly may include a U-shaped bracket having a crossing portion disposed towards the sunroof panel and also having two leg portions having outer sides. The front glider assembly may further include elastic elements, which may also be referred to herein more specifically as molded plastic pads attached to the outer sides of the legs of the U-shaped bracket.

In embodiment of the present invention, the sunroof track may have portions projecting over the edges of the plastic pads and, further, the portions of the sunroof track projecting over the plastic pads may engage the molded plastic pads attached to the outer sides of the legs of the U-shaped bracket so as to retain that bracket and the attached molded plastic pads in the track while allowing sliding movement of the U-shaped bracket and attached molded plastic pads along the track. Such embodiments of the present invention may further include means for taking up any clearance between the molded plastic pads and the track. The means for taking up any clearance between the molded plastic pads and the track may include at least one spring. The at least one spring may be two springs, each of which is an integral part of one of the molded plastic pads.

Embodiments of the present invention may include means for attaching the front glider assembly to the sunroof panel.

In embodiments of the present invention, the sunroof housing may generally be in a horizontal plane and have portions defining two generally parallel tracks; the sunroof panel may have a front side and a rear side, both of which sides generally define lines perpendicular to both tracks when lying in the same plane as those tracks; and all points along the lines defined by the front and rear sides move generally uniformly insofar as that all points on those lines remains equidistant from the horizontal plane in which the sunroof housing generally lies during all operations of the sunroof.

Embodiments of the present invention may include two front glider assemblies, one in each track of the housing. Each of the front glider assemblies may have a front side and a rear side, the front side being disposed closer to the front side of the sunroof panel than the rear side; each of the molded plastic pads may have a front side and a rear side, the front side being disposed closer to the front side of the front glider assembly than the rear side; and, wherein each of the molded plastic pads may have an upper side facing the projecting portions of the housing, the upper side relieved from where the upper side engages the front side to where the upper side engages the rear side of the front glider assembly. The front side of the front glider assembly may be rounded.

Embodiments of the present invention may include a wind deflector arm. Such embodiments may also include means for pivotally attaching the wind deflector arm to the housing. The means for pivotally attaching the wind deflector arm to the housing may include a mounting bracket. The mounting bracket may be positioned in the track of the housing. The mounting bracket may be adapted to be straddled by the U-shaped bracket of the front glider assembly. The wind deflector arm may be spring biased away from the housing. The wind deflector arm may be pressed towards the housing by the U-shaped bracket when the U-shaped bracket slides over the wind deflector arm.

According to the teachings of the present invention, the rear adjuster assembly includes a disk mounted on a bracket, which bracket is mounted on the sunroof panel. Such embodiments may also include a lift arm assembly. Such a lift arm assembly may include a lift arm having an end, and the end of the lift arm may be eccentrically attached to the disk of the rear adjuster assembly. Such embodiments may also include a preset spring force applied to the disk, the spring force requiring a small torque to rotate the disk but the spring force preventing rotation when a large load is placed on the sunroof panel above where the bracket is mounted on the sunroof panel.

In embodiments of the present invention, the sunroof housing may generally lay in a horizontal plane and have portions defining two generally parallel tracks, the sunroof panel may have a front side and a rear side, both of which sides generally define lines perpendicular to both tracks when lying in the same plane as those tracks; and all points along the lines defined by the front and rear sides move generally uniformly insofar as all points on those lines remain equidistant from the horizontal plane in which the sunroof housing generally lies during all operations of the sunroof.

The rear adjuster assembly according to the present invention may have a front side and rear side, the rear side closer than the front side to the rear side of the sunroof panel and the sunroof may also include means for causing the disk to slide in the direction of the rear side of the rear adjuster assembly at adjustment extremes.

According to the teachings of the present invention, a drive assembly for moving a cover with respect to an opening includes at least one flexible tape having perforations, the at least one flexible tape operatively connected to the cover; and means for causing selective movement of the at least one flexible tape. The means for causing selective movement may include a drive motor having an output shaft and a gear operatively connected to the output shaft, the gear having teeth adapted to engage the at least one flexible tape. Embodiments of the present invention may also include a gear adapter disposed between the gear and the output shaft. Embodiments of the present invention may also include means for manually operating the means for causing selective movement. The means for manually operating the means for causing selective movement may include means for engaging the gear adapter.

According to the teachings of the present invention, a sunroof assembly for a vehicle having an opening in its roof includes a sunroof panel and means for driving the sunroof panel. Further according to the teachings of the present invention, the means for driving includes at least two flexible tapes having perforations operably connected to the sunroof panel, and a gear having teeth which engage the perforations in the at least two flexible tapes. The teeth of the gear may have truncated oval cross-sections. The perforations of the tape may be truncated oval shaped with two substantially parallel opposing sides. The truncated oval shaped perforations may have two opposing curved sides, wherein the two substantially parallel opposing sides are spaced apart by a distance greater than a distance between the opposing curved sides.

Embodiments of the present invention may also include means for manually operating the means for driving. The means for manually operating may include a gear adapter having a receptacle for a means for actuating the gear adapter. The receptacle may include a threaded opening. The gear adapter may be a hex gear adapter.

According to the teachings of the present invention, a cover with respect to an opening includes means for producing a first signal indicative of operator desire, means for producing a second signal indicative of cover position, and a integrated circuit chip responsive to the first signal and the second signal. In certain embodiments of the present invention, the drive assembly may include a drive motor and, further, the integrated circuit chip may produce a drive motor control signal. The means for producing a first signal may include means for producing a pulse signal and a continuous signal. The means for producing a pulse signal and a continuous signal may be a rocker switch or it may be a push button switch. The means for producing a second signal may include at least one limit switch. The at least one limit switch may be at least one reed limit switch and/or it may be at least one Hall effect limit switch.

According to the teachings of the present invention, a sunroof assembly for a vehicle having an opening in its roof includes a sunroof panel, means for driving the sunroof panel, a switch subject to operator control, and means for controlling the means for driving the sunroof panel based on impulses and continuous signals from the switch. The means for controlling may be a control chip. The control chip may be constructed so as to allow sunroof closing only when receiving a continuous signal from the switch. Embodiments of the present invention may also include means for indicating at least one position of the sunroof panel in communication with the sunroof panel.

Embodiments of the present invention may also include means for relaying information regarding the position of the sunroof panel to the control chip. The means for indicating may be at least one sensor.

According to the teachings of the present invention, glider assembly adapted to move along a guide includes a U-shaped member having two legs with outer sides, and elastic elements attached to the outer sides of the legs of the U-shaped member. Such a glider assembly may also include means for taking up clearance between the elastic elements and the guide. Such means may include at least one spring. The at least one spring may include two springs, each of the springs being an integral part of one of the elastic elements A glider assembly according to the present invention may also include means for attaching the glider assembly to an object to be moved along the guide. A glider assembly according to the present invention may have a front side and a rear side; each of the elastic elements may have a forward side and a rearward side, the forward side being disposed closer to the front side of the glider assembly than the rear side; and each of said elastic elements may have an upper side relieved from the forward side to the rearward side of the glider assembly. The forward sides of the elastic elements may be rounded.

According to the teachings of the present invention, sunroof with respect to an opening in the roof of a vehicle includes at least one flexible tape having perforations, the at least one flexible tape operatively connected to the cover; and means for causing selective movement of the at least one flexible tape. The means for causing selective movement may include a drive motor having an output shaft and a gear operatively connected to the output shaft, the gear having teeth adapted to engage the at least one flexible tape. An assembly according to the present invention may also include a gear adapter disposed between the gear and the output shaft. Still further, as assembly according to the present invention may also comprise means for manually operating the means for causing selective movement. The means for manually operating the means for causing selective movement may include means for engaging said gear adapter. A sunroof assembly according to the present invention for a vehicle having a roof with an opening includes a sunroof panel; and means for driving the sunroof panel, the means for driving including at least two flexible tapes having perforations operably connected to the sunroof panel, and a gear having teeth which engage perforations in the at least two flexible tapes. The teeth may have a truncated oval cross-section. The perforations may be truncated oval shaped openings having two substantially parallel opposing sides. The perforations may also have two opposing curved sides and the two substantially parallel opposing sides may be spaced apart by a distance greater than a distance between the opposing curved sides. A sunroof according to the present invention may also include means for manually operating the means for driving. The means for manually operating may include a gear adapter having a receptacle for a means for actuating said gear adapter. The receptacle may include a threaded opening. The gear adapter may be a hex gear adapter.

According to the teachings of the present invention, a control assembly for a drive assembly for moving a cover with respect to an opening includes means for producing a command signal, means for producing a signal indicative of cover position, and an integrated circuit chip responsive to said command signal and said signal indicative of cover position. The means for producing the command signal may include means for producing a pulse signal and a continuous signal. The means for producing the signal indicative of cover position may include at least one limit switch. The at least one limit switch may be at least one reed limit switch and/or it may be at least one Hall effect limit switch. The means for producing a pulse signal and a continuous signal may be a switch. The means for producing a pulse signal and a continuous signal may be a push button switch or a rocker switch.

According to the teachings of the present invention, a sunroof assembly for a vehicle having a roof opening includes a sunroof panel; a means for driving the sunroof panel operatively connected to the sunroof panel; means for controlling the means for driving the sunroof panel based on impulses and continuous signals from a switch, the means for controlling electrically connected to the means for driving; and a switch subject to operator control, said switch electrically connected to the means for controlling. The means for controlling may include a control chip. The control chip may be constructed so as to allow sunroof closing only when receiving a continuous signal from the switch. According to the teachings of the present invention, a sunroof assembly may also include means for indicating at least one position of the sunroof panel in communication with the sunroof panel. Still further, a sunroof assembly according to the teachings of the present invention may include means for relaying information regarding the at least one position of the sunroof panel to the control chip. The means for indicating may be at least one sensor.

The mechanism according to the present invention may include means for suppressing vertical movement of the slide plate from the track, which means could be the lash spring. The assembly according to the present invention may include a tape guide for guiding the tape or tapes, which tape guide may surround the tape or tapes. Embodiments of the present invention may include separated, adjacent tape guide portions surrounding two parallel disposed tapes adapted to move in opposite directions.

Embodiments of the present invention may include a trough carried by the second elongate element. This trough may be transversely disposed above the sunroof panel. Other means for holding the trough in position may be employed.

The present invention may include a gear box surrounding the gear, serving as a mounting platform for the motor, and serving as a discrete path defining means for the tape or tapes.

In embodiments of the present invention, the gear and gear adapter may snap fit together. Such a snap fit may be effected by projecting portions on the gear and portions of the gear adapter forming recesses.

Accordingly, it is an object of the present invention to provide a sunroof having few moving parts so as to be reliable and easy to service.

It is another object of the present invention to provide a compact and lightweight sunroof.

Yet another object of the present invention is to provide a sunroof that may be quickly and easily installed.

Still yet another object of the present invention is to provide a sunroof that operates smoothly and quietly.

A further object of the present invention is to provide a sunroof inclined to remain in balance.

Yet a further object of the present invention is to provide a sunroof that may be safely used and operated.

BRIEF DESCRIPTION OF THE DRAWINGS

Other objects, advantages, new features of the invention will become apparent from the following detailed description of the invention when considered in conjunction with the accompanying drawings wherein:

FIG. 2 is a perspective view of the sunroof according to the present invention;

FIG. 15 is a rear side view of a sunroof according to the present invention moving toward the open position;

FIG. 16 is a rear side view of a sunroof according to the present invention in the closed position;

FIG. 17 is a rear side view of a sunroof according to the present invention in the venting position;

FIG. 18 is a top plan view of a tape drive gear that is incorporated into a preferred embodiment of the present invention;

FIG. 19 is a cross-sectional view taken along line 19—19 in FIG. 18;

FIG. 20 is a cross-sectional view taken along line 20—20 in FIG. 18;

DESCRIPTION OF THE PREFERRED EMBODIMENTS

Figure 1:
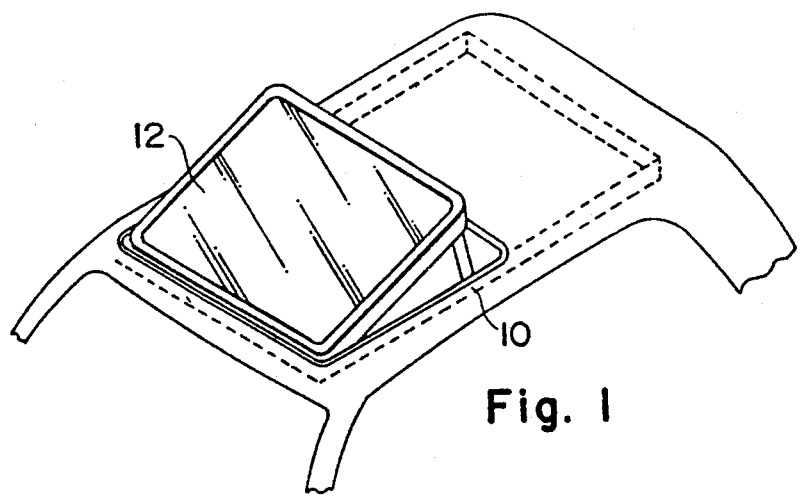
FIG. 1 is a perspective view of a vehicle having mounted therein a sliding roof assembly according to the teachings of the invention in the venting position.
Figure 12:
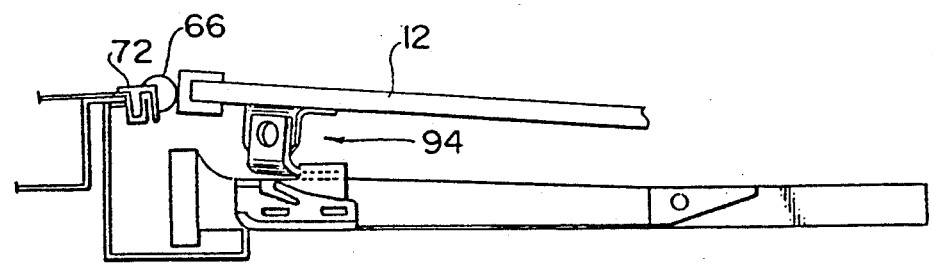
FIG. 12 is a front side view of a sunroof according to the present invention moving toward the open position.
Figure 13:
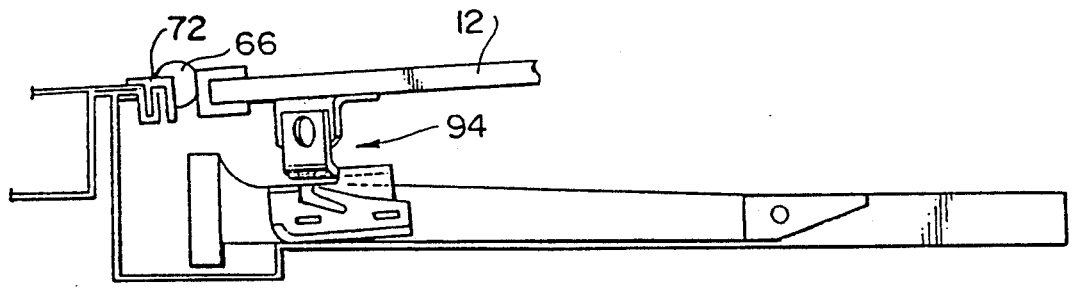
FIG. 13 is a front side view of a sunroof according to the present invention in the closed position.
Figure 14:
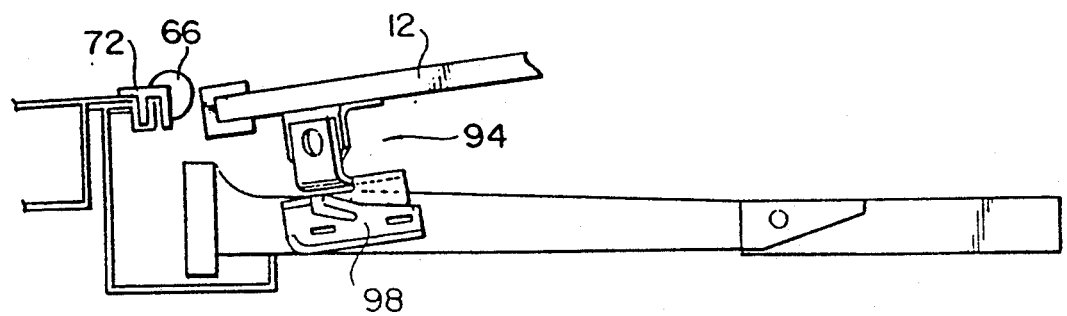
FIG. 14 is a front side view of a sunroof according to the present invention in the venting position.

The present invention comprises a sliding sunroof for a vehicle roof having an opening therein. The sunroof comprises a sunroof housing 10 which houses a roof panel 12. The rear of roof panel 12 can be positioned in three positions: an open position, which is its lowest position and is illustrated in FIGS. 12 and 15, a closed position, in which the rear of panel 12 is raised with respect to the open position, and which is illustrated in FIGS. 13 and 16, and a venting position, in which panel 12 is raised to an even higher position, which is illustrated in FIGS. 1, 14 and 17.

To facilitate understanding of the present invention, a component list is set forth below. The component list, the specification, and the drawings may be studied in association with each other. To further facilitate understanding of the present invention, major subportions of the present invention are discussed hereinbelow (both as to structure and operation) in individually labelled subdivisions.

COMPONENT LIST

10: sunroof housing
12: roof panel (typically formed of glass)
14: drive means
15: drive motor
16: gear box
18: drive gear
20: drive tape
21: drive tape
22: guide channel
23: guide channel
28: tape guide extrusion
29: tape guide extrusion
30: part of sunroof track
31: part of sunroof track 32: hex gear adapter
40: stop plate
42: slide plate
44: lift arm
52: first pin
54: second pin
60: track groove (part of housing 10)
62: limit switch
64: magnet
66: front seal
72: trim ring
76: panel height adjuster body
78: panel mount
80: belleville spring washer
82: adjustment screw
84: torque drive socket
88: lash take-up spring
92: wind deflector
94: U-shaped bracket, front glider
98: pads
04: panel bracket
106: sliding panel bracket
108: front glider screw
110: rear trough
112: switch (e.g., rocker or push button)
114: control circuit
116: sunshade
128: crank

Drive System

Figure 21:
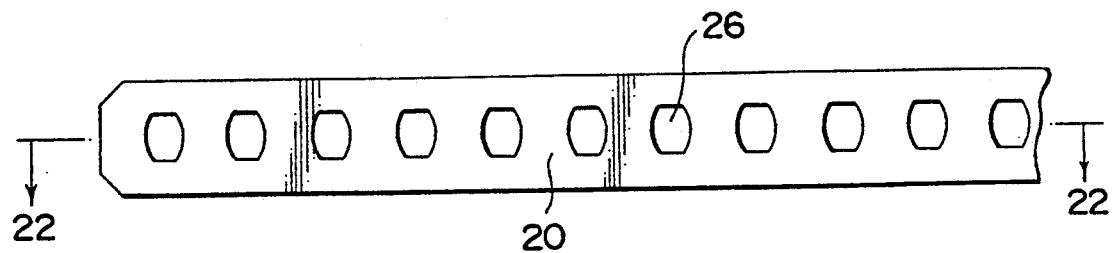
FIG. 21 is a top plan view of a portion of a perforated drive tape incorporated into a preferred embodiment of the present invention.
Figure 22:
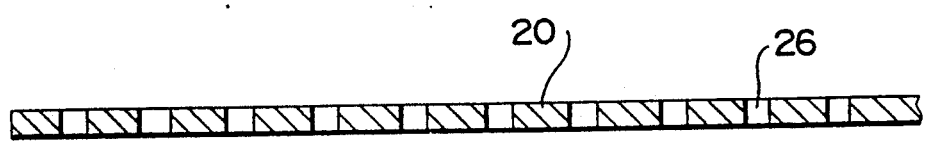
FIG. 22 is a cross-sectional view taken along line 22—22 in FIG. 21.
Figure 29:
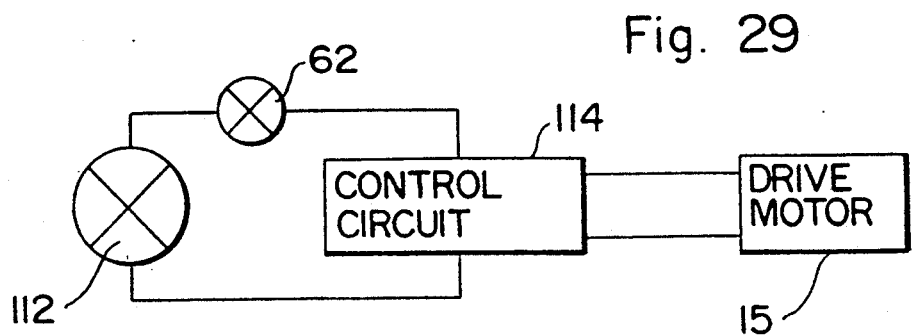
FIG. 29 is a schematic diagram of the basic electronic control mechanism of the present invention.
Figure 25:
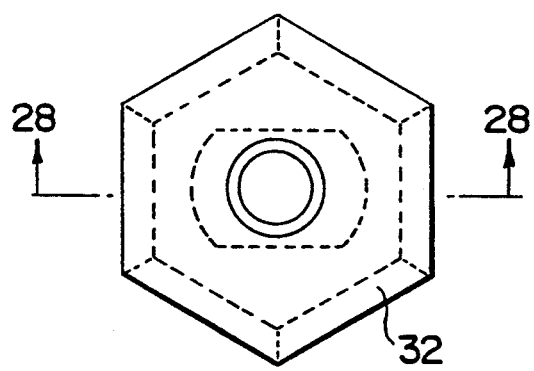
FIG. 25 is a top plan view of a hex gear adapter that is incorporated into a preferred embodiment of the present invention.
Figure 26:
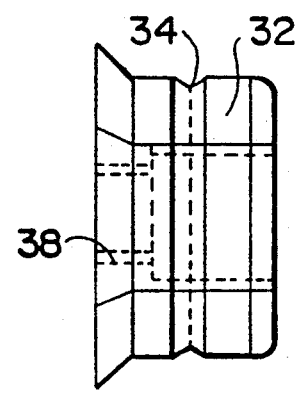
FIG. 26 is a side view of the hex gear adapter shown in FIG. 25.
Figure 27:
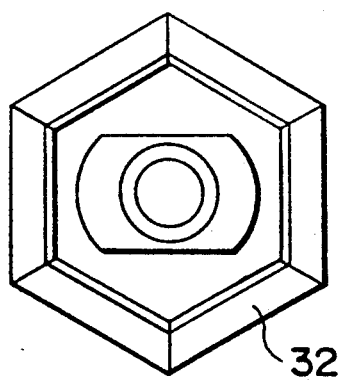
FIG. 27 is a bottom plan view of the hex gear adapter shown in FIG. 25.
Figure 28:
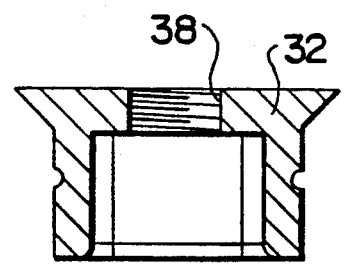
FIG. 28 is a cross-sectional view taken along line 28—28 in FIG. 25.

Referring to FIG. 2, the sunroof can be seen to include a drive means, generally designated 14, for driving panel 12 forward and rearward. Drive means 14 includes a drive motor 15 (shown schematically in FIG. 29) attached to a gear box 16 having a drive gear 18 preferably having teeth (shown in FIGS. 18–20) which rotates during operation of drive motor 15. Drive means 14 further includes two drive tapes 20, 21 which are preferably flexible and have perforations for engaging teeth of the drive gear (a portion of one of which is shown in a partial sectional cut taken in FIG. 2, other portions may be seen in FIGS. 15–17 and, in greater detail, in FIGS. 21–23) which run through two separate guide channels 22, 23. Drive tapes 20, 21 are connected to opposite sides of panel 12 so as to be able to impart driving forces on panel 12.

In the preferred embodiment of the present invention, which embodiment is shown in the drawings, both drive tapes 20, 21 are driven by the same drive gear 18 so as to be kept in timing with each other, that is, so as to be advanced or withdrawn at the same speed while maintaining the same relative position to each other. Referring to FIGS. 18–20, drive gear 18 can be seen to have a plurality of teeth 24 on its periphery which teeth operate to engage perforations 26 along the lengths of drive tapes 20, 21.

Drive tapes 20, 21, being flexible, may be guided around drive gear 18 along specific paths defined by gear box 16. It has been found that maintaining minimum running clearance through all drive system components is of critical importance. The paths defined by gear box 16 and guide channels 22, 23 ensure minimum running clearances in a sunroof according to the present invention. If too much clearance develops along a tape path, compressive loads can cause the tape to ribbon, which generally destroys tape integrity, especially, as is typical, if the tape is formed of aligned polyester.

Figure 24:
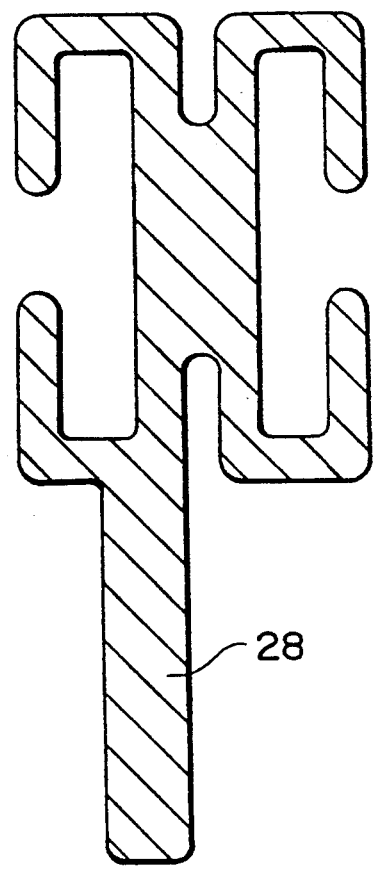
FIG. 24 is a cross-sectional view of a tape guide extrusion which forms part of a preferred embodiment of the present invention.

As drive tapes 20, 21 exit gear box 16, they are contained and guided through formed extrusions or tape guides 28, 29 (one of which is shown in cross-section in FIG. 24). These tape guides connect to formed parts 30, 31 of the sunroof track. Integral to these formed parts 30, 31 are channels which carry the tapes 20, 21 forward to the driven mechanism.

It should be appreciated by those skilled in the art that as each tape 20, 21 is withdrawn into gear box 16, the excess lengths of the tapes are stored in one half of the formed tape guides or tape channels 22, 23. As can be seen in FIG. 2, each curved tape guide path effectively doubles back, after making a 180 degree radial bend, to contain the excess tape which has been drawn through the gear box 16. This is done to minimize the overall size of the drive system.

In a preferred embodiment of the present invention, drive gear 18 is coupled to an output shaft (not shown) of the drive motor 15 by a coupling device such as hex gear adapter 32, which is shown in FIGS. 25–28. As should be appreciated by those skilled in the art, the output shaft of the drive motor must have surfaces (e.g., two flats 180 degrees apart) which can engage mating flats on hex gear adapter 32. A 12 V D.C. powered electric gear motor would be a suitable drive motor for a sunroof according to the present invention.

Also in a preferred embodiment of the present invention, hex gear adapter 32 has certain characteristics. First, hex gear adapter 32 has recesses 34 formed into its six flat sides to accept small projections 36 on the inside six flat sides of drive gear 18 (see FIGS. 19 and 28). As these recesses 34 and projections 36 are present, a snap fit between the hex gear adapter 32 and the drive gear 18 assures the integrity of their junction under normal operating conditions. Another characteristic of the hex gear adapter 32, in a preferred embodiment of the present invention, is its easy removability in an emergency situation. Such a situation would be when the car has a dead battery. In such a situation it would be desirable to be able to operate the sunroof manually. The hex gear adapter 32 facilitates manual operation by having a threaded portion 38.

An access cover can be provided in the headliner of an automobile having a sunroof according to the present invention, which access cover could be removed in an emergency to expose hex gear adapter 32.

Figure 30:
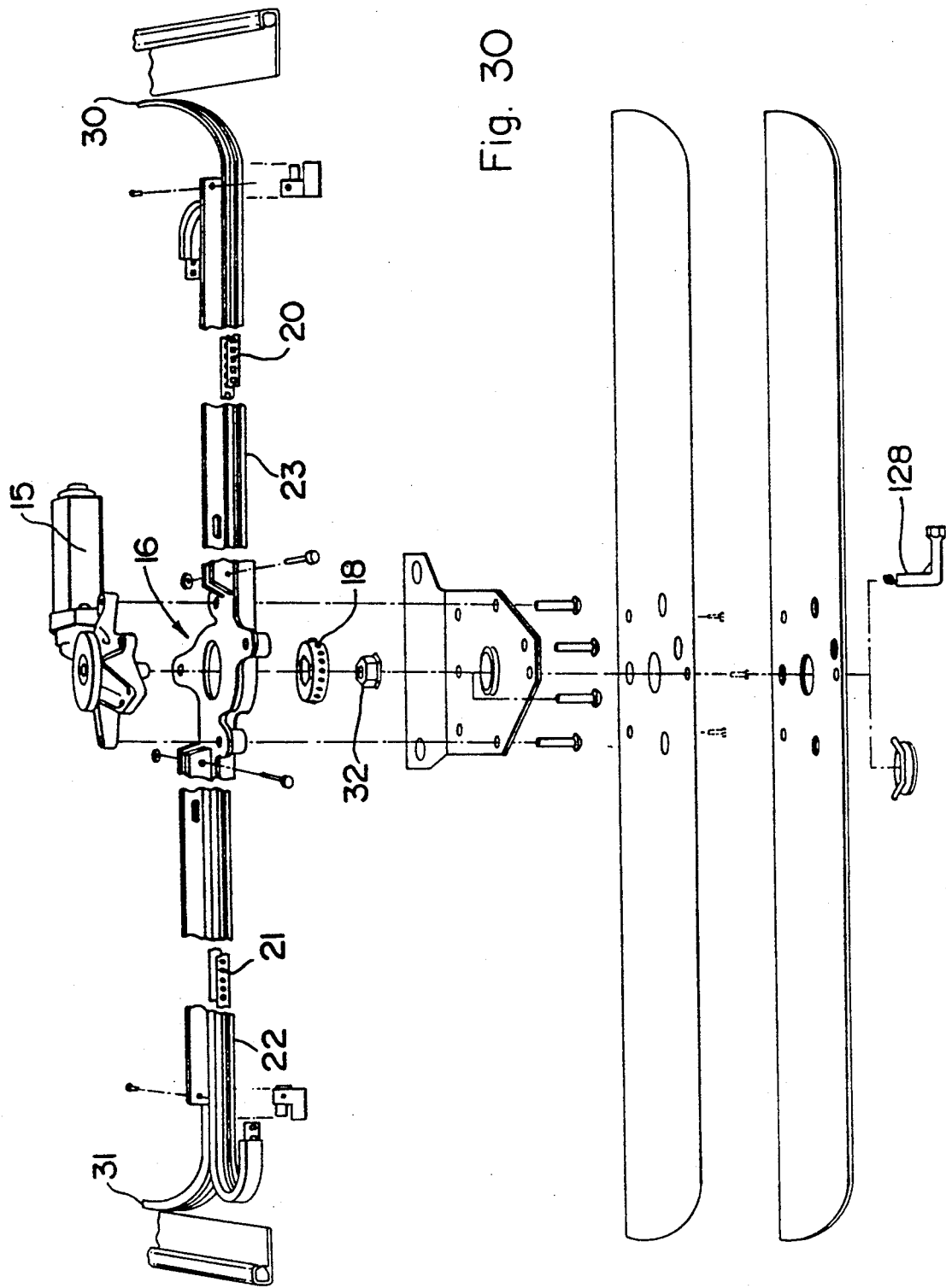
FIG. 30 is an exploded view in partial cross-section of a drive assembly according to the present invention.

An emergency crank 128 (shown in FIG. 30) having a threaded end can be engaged with threaded portion 38 of hex gear adapter 32. Once fully engaged, further tightening of crank 128 will cause its threaded end to "bottom out" on the gear motor drive shaft, thus withdrawing the hex gear adapter 32 with very little effort. At that point, assuming crank 128 has a portion which can engage the tape drive gear and act as a bearing surface (e.g., an end with six flats on its outside walls with an internal pilot diameter), crank 128 can be so engaged with the tape drive gear to turn it and, thus, open or close the sunroof panel as desired.

Based on the foregoing, those skilled in the art should appreciate, in part, that gear box 16 performs a number of important functions. First, it provides discrete paths for drive tapes 20, 21 to follow with precise clearances. Second, it serves as a motor mounting platform which locates the gear motor on a pilot fit. Third, it functions to connect its internal tape paths with tape guides 22, 23. Additionally, it provides proper clearances and protection for tape drive gear 18.

Figure 23:
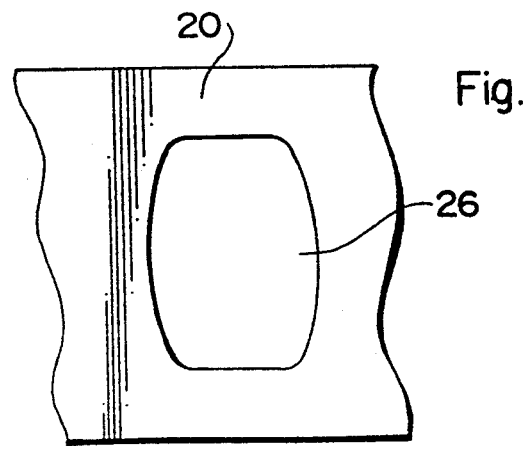
FIG. 23 is an enlarged view of a perforation shown in FIG. 21.

With special reference to FIGS. 20 and 23, it can be seen that in a preferred embodiment of the present invention drive gear teeth 24 and drive tape perforations have generally truncated oval shapes, that is, oval shapes with the opposing, farthest spaced sides flattened. These shapes have been found to work especially well in a constructed embodiment of the present invention.

It should also be recalled (having been mentioned in the Summary of the Invention section above) that it is by preferred that the main portion of the drive system of the present invention is disposed generally to the rear of the sunroof, relative to the front of the vehicle. It is so disposed so the sunroof can be disposed farther forward, in which position its ability to enhance visual perception in the forward portions of the passenger compartment (which are, it should be noted, those portions most often occupied during vehicle operation) is maximized.

Overlapping Groove Mechanism

Figure 3:
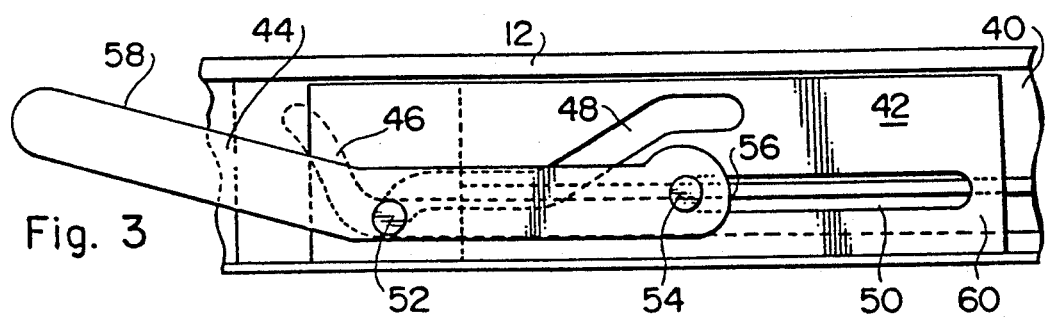
FIGS. 3-5 are successive views of the overlapping groove mechanism of the present invention in operation.
Figure 4:
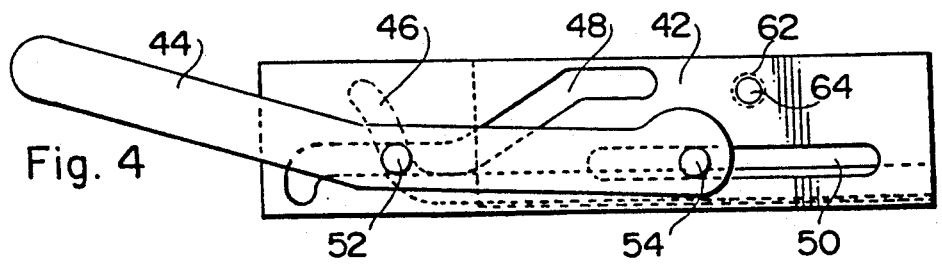
Figure 5:
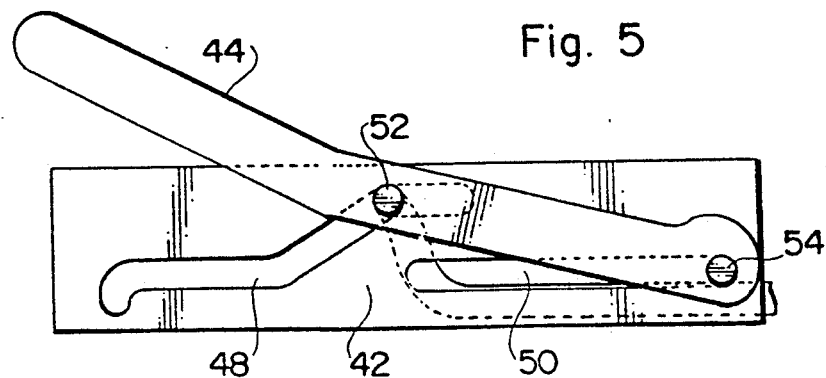

Referring to FIGS. 3-5, wherein the overlapping groove mechanism is clearly illustrated, this can be seen to include a fixed or stop plate 40, a slidable or slide plate 42, and a lift arm 44. It can be further seen, at least in the embodiment illustrated in FIGS. 3-5, that portions of slide plate 42 form a first groove 48 and second groove 50, and that lift arm 44 carries a first pin 52. Still further, it can be seen that first pin 52 can slide in grooves 46 and 48 and that second pin 54 can slide in groove 50.

It should be appreciated that lift arm 44 is carried by slide plate 42 via first pin 52 and second pin 54. Second pin 54, which, as mentioned above, can slide in groove 50, effectively holds end 56 of lift arm 44 in a fixed position vertically while allowing horizontal movement. While groove 50 allows only such horizontal movement, groove 48, on the other hand, can allow three distinct types of motion. In the lowermost position of first pin 52 in groove 48 (shown in FIG. 3), groove 48 bears on first pin 52 at approximately a 20 degree angle with the direction of motion (that is, either direction indicated by double-headed arrow 58). First pin 52 is constrained vertically by a track groove 60, which is located behind the lower section of groove 48 in slide plate 42. Track groove 60 is formed on housing 10. The location of first pin 52, therefore, is defined by overlapping grooves; horizontally its location is defined by the lowermost section of groove 48 in slide plate 42 and vertically its location is defined by track groove 60.

As slide plate 42 moves forward (that is, right to left in FIG. 3), first pin 52 contacts the lower portion of "stop" groove 46. Stop groove 46 may be considered to be a continuation and termination of track groove 60. As the forward sliding motion continues, first pin 52 is lifted up out of the lowermost section of groove 48 in slide plate 42 to a section of groove 48 that bears on first pin 52 at approximately a 20° angle. At this point, groove 48 and slide plate 42 can impart a vertical component of force on first pin 52. Stop groove 46 now controls the horizontal position of first pin 52, causing it to follow an elliptical path such that the front panel 12 position is exactly controlled.

Referring now to FIG. 4, groove 48 in slide plate 42 holds first pin 52 in position vertically as slide plate 42 continues to move horizontally forward. This allows a set amount of drive travel so that slide 42 can be stopped in the (panel 12) closed position without overshooting or undershooting the closed position. At this point, a limit switch 62, which limit switch is mounted on stop plate 40 and which limit switch may be actuated by a magnet such as magnet 64 mounted on slide plate 42, may become aligned with magnet 64, actuate, and signal a motor controller 114 (shown in FIG. 29) that the closed position has been attained.

As slide plate 42 continues to move forward, first pin 52 comes into contact with both stop groove 46 and groove 48 in slide plate 42. Groove 48 in slide plate 42 lifts first pin 52 upward while stop groove 46 continues to guide first pin 52 through an elliptical path to control the location of the front edge of panel 12.

Figure 6:
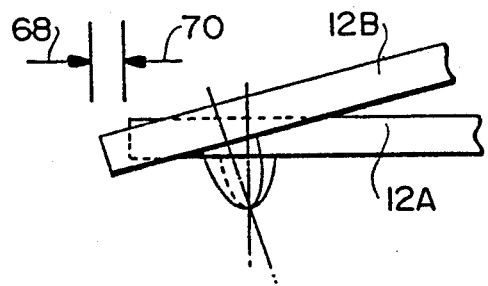
FIG. 6 illustrates certain details relating to sunroof panel motion between the closed and venting positions.

The overlapping groove mechanisms described immediately above has a number of desirable characteristics. First, the mechanism is self-locking. Therefore, no front locking devices are needed. Further, since the stop groove 46 exactly controls the horizontal position of the front of panel 12, it can be set to pull the panel slightly rearward as the panel lifts into the venting position. This rearward pull acts to eliminate excess squeezing of a front seal 66 (shown in FIGS. 12-14) because of geometric constraints relating to the location of the front pivot point. These geometric constraints are schematically illustrated in FIG. 6. There, reference numeral 12A signifies the front of panel 12 in the closed position and reference number 12B designates the front of panel 12 in the venting position. The distance separating the heads of arrows 68 and 70 is the distance that the panel moves forward when it lifts into the vent position. As stated above, this forward motion can be compensated for by the mechanism of the present invention as it operates to pull the panel slightly rearward.

There are a number of other desirable characteristics of the overlapping groove mechanism of the present invention. For example, all horizontal adjustment of panel 12 location when closing and venting are made at one point. By moving stop groove 46 location horizontally along track 60 (which may extend along the entire length of the side of housing 10) panel 12 is aligned exactly with the panel opening in the front to rear direction. In addition, since a closed limit switch 62 can be conveniently located on stop plate 40, any adjustment of stop plate 40 will (assuming the closed limit switch 62 is located on stop plate 40) simultaneously adjust the stop position of first pin 52 in the middle section of groove 48 and slide plate 42. Thus, no matter where stop plate 40 is positioned (which positioning takes only one adjustment), the mechanism of the present invention will stay in proper synchronization. Yet another desirable characteristic of the present invention is the fact that because panel 12 is always under control by a system of overlapping grooves, it can never slam shut, fly open, or otherwise be affected by pressure differences between the inside and outside of the vehicle. The mechanism of the present invention can pull down on panel 12 with as much force as it can exert to lift panel 12 up. Further, since first pin 52 leaves stop groove 46 and enters track groove 60, first pin 52 is automatically constrained in the vertical direction. Therefore, lift lever 44 can never "kick-up" prematurely.

It should be appreciated by those skilled in the art that the overlapping groove mechanism of the present invention comprises very few parts. Accordingly, this mechanism should be very durable, reliable, and easy to service. It should also be apparent to those skilled in the art that the mechanism of the present invention is very compact. This makes it especially suitable for small automobiles or any automobiles in which headroom space is at a premium. Of course, the ramp angles on the lower portion of stop groove 46 and on the lower and top portions of groove 48 in slide plate 42 can be adjusted to provide easy and smooth lifting and lowering of first pin 52 and the rear of panel 12. It should also be noted that since there is no vertical component of drive force exerted on track 60 by first pin 52, no lock is needed to hold first pin 52 away from track 60 (i.e., to avoid excess friction drag forces) in the lowermost position. The first pin 52 slide groove wall effectively bears on first pin 52 in the direction of motion in the bottom position.

Panel Height Adjuster

Figure 7:
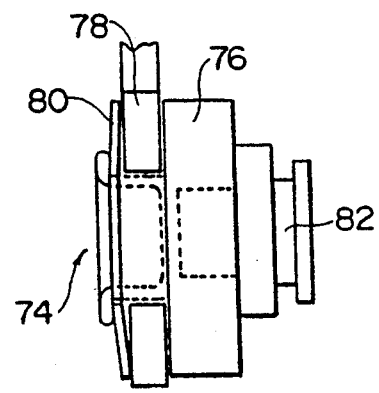
FIG. 7 is a front view of a panel height adjuster according to the )present invention.
Figure 8A:
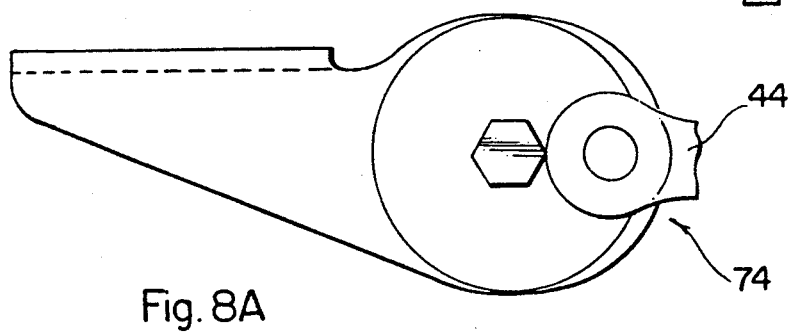
FIGS. 8A and 8B are side views of the panel height adjuster shown in FIG. 7.
Figure 8B:
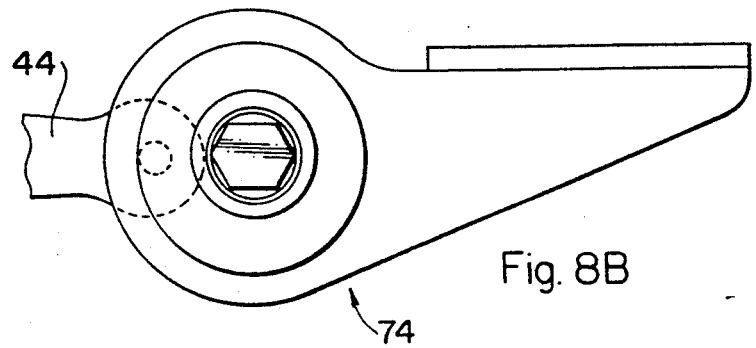

Shown in FIGS. 7 and 8 is a means of moving the front or rear corner of sunroof panel 12 up or down to adjust panel 12 height in relation to the height of a trim ring 72. Such an adjustment is necessary because of normal tolerances of housing 10 and trim ring 72 and because of varying vehicle roof thicknesses. This means, a panel height adjuster, is generally designated by reference numeral 74 in FIGS. 7 and 8.

The panel height adjuster 74, as shown in FIG. 7, includes a body 76 that fits through a panel mount tab 78, a belleville spring washer 80 mounted at the adjuster body's center of rotation, and an adjustment screw 82. Body 76 is also equipped with a hex drive socket 84 (shown in FIG. 8) to facilitate height adjustments.

As should be appreciated by those skilled in the art, as the body of adjuster 74 is rotated by means of the hex adjustment socket 84, lift lever 44 is carried up and down because the lever attachment point is not at the adjuster body's center of rotation. Those skilled in the art will of course recognize that the belleville spring washer 80 exerts enough force between adjuster body 76 and panel mount tab 78 to prevent movement due to all expected vertical forces imposed by panel 12. A reasonable torque at the adjustment socket will, however, rotate adjuster body 76.

The panel height adjuster 74 as described immediately above possesses a number of desirable characteristics. It allows easy one-handed adjustment of panel 12 height when the sunroof panel 12 is closed, at which time the most exact adjustment can be made. Panel 12 height can be rapidly adjusted with the panel height adjuster 74 of the present invention because there is no locking screw to be released and retightened as there is in many prior art mechanisms. It should also be appreciated by those skilled in the art, that the panel height adjuster of the present invention is easy to assemble because of its configuration. More specifically, belleville washer 80 is depressed flat by a staked or rolled edge of adjuster body 76; therefore, no exact dimension need be held.

Lash Take-Up Spring

Figure 9:
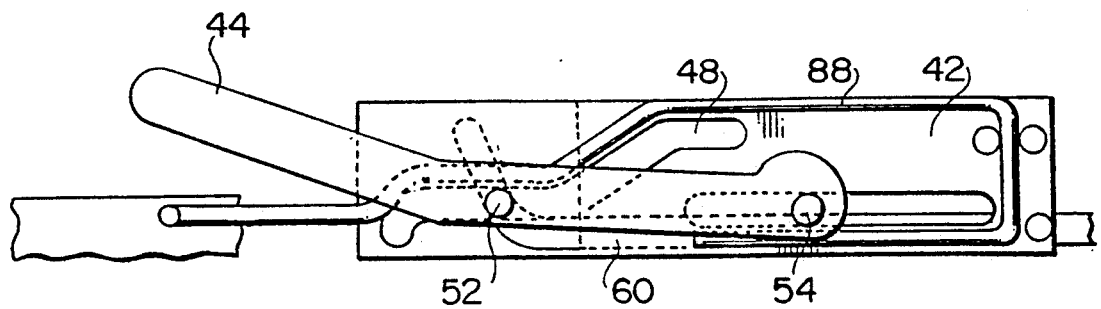
FIG. 9 shows a lash take-up spring incorporated into a sunroof according to the present invention.

Referring now to FIG. 9, it can be seen that a lash take-up spring 88 may be incorporated into the mechanism of the present invention. Lash take-up spring 88 consists of a length of spring wire bent to conform to groove 48 in slide plate 42. Lash take-up spring 88, effectively a beam-type spring, is set into the mechanism of the present invention so as to be carried by slide plate 42 and so as to exert a torsional force on lever arm 44 in relation to mechanism track 60. This torsional force exerted by lash take-up spring 88 "takes-up" any clearances between first pin 52 and second pin 54 and between slide plate 42 and track 60.

Since lash take-up spring 88 conforms to groove 48, a constant torsional force is maintained on lever arm 44 as arm 44 moves from the open to the venting position.

Including a lash take-up spring in the mechanism in the present invention is desirable for a number of reasons. With the mechanism of the present invention so equipped, the need for close tolerance parts is eliminated. Therefore, it is possible to bend track 60 without causing binding problems because increased clearance is permissible between slide plate 42 and track 60. Also, because lash take-up spring 88 conforms with groove 48 in slide plate 42, the force exerted by lash take-up spring 88 is constant. Lash take-up spring 88 is also very effective in eliminating rattles that could be caused by loose fits.

Front Glider Mechanism

The front glider mechanism may be understood by referring to FIGS. 2 and 10-14.

The front glider per se may be interpreted as including slide plate 42, lever arm 44, and height adjustment mechanism 74. So interpreted, panel 12 pivots and slides at the point designated by reference numeral 90 in FIG. 10. The vertical point is located almost exactly at the front edge of panel 12. Lever arm 44 is shaped to provide clearance for panel 12. By using a pivot point "x" (point "x" being a pivot point between adjuster 74 and the front panel pivot point) for lever arm 44, height adjuster 74 motion is transmitted to the front of panel 12 at the point indicated by reference numeral 90. Therefore, in conjunction with the ability to move panel 12 slightly rearwards as sunroof panel 12 tilts upwards (which has been described above) the fact that the virtual pivot point of the sunroof panel 12 is located almost directly beneath the front edge of the panel means that the front edge of the panel 12 will not drop as it vents up.

Those skilled in the art should appreciate that a front glider assembly must perform a number of functions. It must carry the weight of panel 12, allowing a fore and aft sliding motion in track 60. It must also provide a means to rotate the front of panel 12 up and down to allow rotation of panel 12 when opening, closing and venting. Further, it must provide a means of adjusting panel 12 height and lateral position. It must also eliminate the possibility of producing an objectionable rattle and it must provide a means of depressing a wind deflector arm 92 (shown in FIG. 2).

Each of the requirements of a front glider assembly listed in the immediately preceding paragraph are met by the front glider assembly 94 of the present invention. Referring to FIG. 2, front glider assembly 94 may be seen to comprise a U-shaped bracket 96 with pads 98 (only one of which is shown) mounted on each of the legs of the U-shaped bracket. In a preferred embodiment of the present invention, each pad is formed of molded plastic. Referring now to FIGS. 12-14, each pad 98 may be seen to have molded into them small plastic springs 100 to take up any clearance between the pad and track 60. It can be further seen in FIGS. 12-14, that the front end of each pad 98 is rounded and the tail end of each pad 98 is relieved. This allows the pads 98 to rotate in track 60. Operating in this manner, pads 98 allow for both sliding and rotation along the same slide surface, that is, the bottom side of each pad. Since when wind deflector arm 92 is straddled by the U-shaped bracket 96 of front glider assembly 94, wind deflector arm 92 is pushed downward by glider 94 when panel 12 closes.

Figure 10:
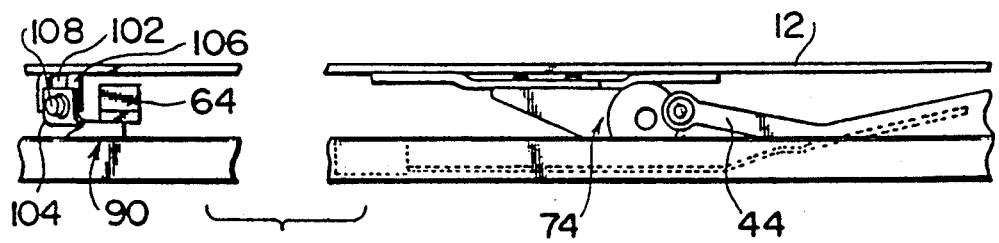
FIG. 10 is a side view of, in part, a front glider mechanism according to the present invention.
Figure 11:
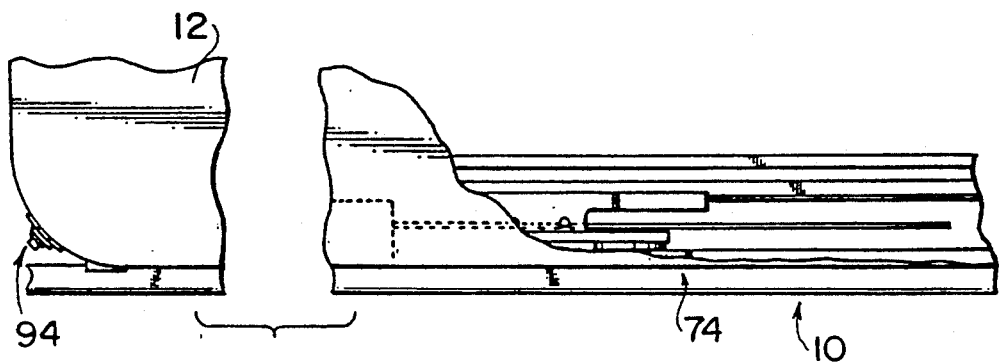
FIG. 11 is a top view of the mechanism shown in FIG. 10.

Referring now to FIG. 10, both transverse and vertical adjustment (in and out from the center line of panel 12) are provided for by a single slot 102, one on each sliding panel bracket 106. The height is raised or lowered by sliding panel bracket 106 upward or downward after loosening front glider screw 108 on panel bracket 104, which bracket is integral with the base of U-shaped bracket 96. Panel 12 can be adjusted transverse to the center line by loosening both front glider screws 108 (see FIG. 2) and pulling them in the desired direction. This can be done because the front glider slot is wider than required for the front glider screw 108.

Sunshade

Referring to FIG. 2, it may be seen that a sunroof according to the present invention may include a sunshade 116. Sunshade 116 has a number of tabs 117 attached to it, which tabs are operable to ride in a guide in a track so that sunshade 116 is independently slidable. Panel 12 (not shown in FIG. 2) effectively rides on top of sunshade 116. Thus, via engagement of panel 12 with raised element 118 (attached to sunshade 116). Sunshade 116 is carried back from a closed to an open position by sunroof panel 12. A sunshade handle 120 is attached to a front end of sunshade 116 so that sunshade 116 can be closed manually when the panel is in the closed position.

Rear Trough

Rear trough 110 (a portion of which is shown in FIG. 2) is designed to channel water that may be present at the rear of panel 12 to the side of housing 10, thereby eliminating drips to the vehicle interior Two trough slides 111 (only one of which is shown) carry the trough 110 at either end of the trough. Trough 110 comprises a rigid gutter with a flexible edge. This flexible edge must flex downward against panel 12 when the sunroof opens. Since second pin 54 moves with the rear of panel 12, proper positioning of rear trough 110 is accomplished in the present invention by attaching the trough slides 111 to the second pins 54.

"One-Touch" Power Sunroof Control

Certain preferred embodiments of the present invention include a "one-touch" logic circuit board which controls the movement of the drive motor. This general arrangement is illustrated in the schematic shown in FIG. 29. Needless to say, a control circuit of the present invention is required to operate under varying conditions of temperature, humidity, vibration, shock and voltage supply as well as other environmental extremes.

The use of a "one-touch" circuit allows for automatic operation by a single press of an "open" switch while still allowing panel adjustment between the extreme open or closed positions. A venting feature is also incorporated into the logic of this circuit. The circuit is activated by a user controlled switch 112. With the sunroof closed, pressing the switch 112 to the "open" position causes the panel 12 to move rearward ("opening"). The panel will continue to open until it either reaches the fully open position and trips a limit switch (such as limit switch 62 shown in FIG. 4) or until switch 112 is depressed again for either "open" or "closed". If panel 12 has stopped before reaching a limit switch, it may be activated again by pressing the appropriate "open" or "closed" switch. Once an open or vent limit switch has been tripped no further movement in the same direction is possible. Pressing switch to the "close" position causes the panel to move forward (closing). The panel 12 will continue to close until it either reaches its fully closed position or until switch 112 is released. Once the panel is fully closed, pressing the "close" switch again actuates the venting function. Here, the rear panel edge moves upward, pivoting on the front glider, tripping the "vent" limit switch. The panel can be returned to the closed position by pressing the "open" switch. If the "open" switch is now held depressed, the unit will pause for approximately two seconds (in the closed position) and then continue opening.

Functional operation of the "one-touch" power sunroof control can be discussed by considering it to be performing three different operations.

The first operation is the roof closed to open mode. Here, an impulse on switch 112 to the open position will activate the complete roof opening. While moving, an impulse on switch 112 to the open or closed position before the panel is completely open will stop movement of the panel. An impulse on switch 112 to the open position from the panel stop mode (discussed in the immediately preceding sentence) will activate the roof opening until the panel 12 reaches an open limit switch. Once an open limit switch is tripped, no further movement in the rearward direction is possible.

A second function that can be discussed is the roof opened to closed mode. Here, pressing switch 112 to the closed position will cause the panel 12 to move forward to the closed position. Releasing switch 112 will cause the panel 12 to stop moving. When the panel trips a closed limit switch, power to the motor will be switched off. After a closed limit switch has been tripped, holding switch 112 in the closed position for more than two seconds will cause the panel to move to the venting position.

Finally, a roof venting mode can be discussed. Here, from the roof closed position, pressing switch 112 to the closed position will cause the panel to move to the venting position. Releasing switch 112 will cause the panel to stop moving. This feature allows finite positioning of the venting position for maximum operator convenience. When the panel trips a venting limit switch, power to the motor will be switched off. From roof vented position, pressing switch 112 (impulse or continuously) in the open position will cause the panel to move to the closed position. This facilitates automatic closing of the panel from the vent position. If switch 112 is held in the open position for more than two seconds after the panel has fully closed (that is, after a closed limit switch has tripped), the panel will begin opening as described in the first function discussed above.

With regard to safety, under normal operating conditions, when the roof panel 12 is opening automatically, depressing switch 112 in either direction stops further opening of the panel. If switch 112 is held depressed in the closed position for longer than two seconds, the panel will begin to vent. Alternatively, if an obstruction is encountered when closing the panel, releasing switch 112 stops forward motion of the panel. An immediate reversal of panel motion is possible by depressing the open position on switch 112. No two second delay is encountered in switching from closing to opening of the panel.

Many modifications and variations of this invention are possible in light of the above teachings. It is therefore to be understood that within the scope of the appended claims, the invention may be practiced otherwise than as specifically described.

We claim:

1. An assembly for moving a cover with respect to an opening, said assembly comprising:
   a) a housing defining a first guide groove; and
   b) means for movably mounting said cover on said housing; said means for movably mounting comprising:
      i) a stop plate mounted on said housing, said stop plate having groove portions defining a continuation and termination of said first guide groove;
      ii) a slide plate mounted on said housing for sliding movement, said slide plate having portions defining a second guide groove;
      iii) a lift arm pivotally attached to said slide plate and operatively connected to said cover; and
      iv) a first pin attached to said lift arm, and, during sliding movement of said slide plate, for slidingly riding simultaneously in said first guide groove and in said second guide groove, and for entering into and exiting from said groove portions defining said continuation and termination of said first guide groove, so that while simultaneously riding inn said second guide groove and in said groove portions defining said continuation and termination of said first guide groove, said first pin pivots said lift arm to move said cover, said first guide groove remaining stationary during movement of said first pin in relation thereto.

2. The assembly as recited in claim 1 wherein said sliding movement of said slide plate is toward and away from said stop plate, and, wherein said housing is disposed in a plane, said continuation and termination of said first guide groove has a first inclined portion inclined relative to said plane, and said second guide groove has a second inclined portion inclined relative to said plane and opposedly inclined to said first inclined plane, so that during simultaneous riding of said first pin in said first guide groove and in said continuation and termination of said second guide groove:
   a) sliding movement of said slide plate toward said stop plate provides an overlapping relationship between said first guide groove and said second guide groove to raise said first pin; and
   b) sliding movement of said slide plate away from said stop plate withdraws said overlapping relationship to lower said first pin.

3. The assembly as recited in claim 2, wherein said continuation and termination of said first guide groove comprises a slot having an open end for entry and exit of said first pin.

4. The assembly as recited in claim 3, wherein said second guide groove has a closed first end and a closed second end.

5. The assembly as recited in claim 2, wherein said slide plate has portions defining a third guide groove.

6. The assembly as recited in claim 5, further comprising a second pin attached to said lift arm and adapted to slidingly ride in said third guide groove.

7. The assembly as recited in claim 6, wherein said third guide groove has a longitudinal axis which is substantially parallel to said plane.

8. The assembly as recited in claim 6, further comprising a trough carried by said second pin.

9. The assembly as recited in claim 1, further comprising a clutch mechanism connected between said cover and said lift arm.

10. The assembly as recited in claim 1, wherein said cover is a sunroof panel and said opening is in the top of a vehicle.

11. The assembly as recited in claim 10 wherein said top of said vehicle is curved and said housing has a configuration curved to correspond to the curved top of said vehicle.

12. A mechanism for moving a cover with respect to a housing defining an opening, said mechanism comprising:
   i) a track associated with said housing;
   ii) a stop plate mounted on said housing, said stop plate having portions defining a first guide groove providing a continuation and termination of said track;
   iii) a slide plate mounted for sliding movement in said track of said housing, said slide plate having portions defining a second guide groove;
   iv) a lift arm attached to said cover and pivotally attached to said slide plate; and
   v) a first pin mounted on said lift arm, said first pin having portions projecting into said second guide groove, and having other portions projecting into said track, so that said first pin simultaneously tracks said second guide groove and said track during sliding movement of said slide plate, said other portions of said first pin:
      a) entering into said first guide groove, simultaneously tracking said second guide groove and said first guide groove, and exiting from said first guide groove, during sliding movement of said slide plate; and
      b) pivoting said lift arm while simultaneously tracking said second guide groove and said first guide groove, said track remaining stationary during movement of said first pin in relation thereto.

13. The mechanism as recited in claim 12, wherein said sliding movement of said slide plate is toward and away from said stop plate, said first guide groove has a closed end and an open end for entry of said first pin therein and exit of said first pin therefrom, and said second guide groove has one closed end and another closed end.

14. The mechanism as recited in claim 13, wherein said one closed end of said second guide groove constitutes a notch for engaging said first pin in a first position.

15. The mechanism as recited in claim 14, wherein said notch is adjacent to said track.

16. The mechanism as recited in claim 15, wherein said second guide groove further comprises a first plateau portion having a first end, a second end, and a longitudinal axis generally parallel to a longitudinal axis of said track of said housing.

17. The mechanism as recited in claim 16, wherein said second guide groove further comprises a fist ramp portion interconnecting said notch and said first end of said first plateau portion.

18. The mechanism as recited in claim 17, wherein said second guide groove further comprises a second plateau portion having a longitudinal axis generally parallel to said longitudinal axis of said track.

19. The mechanism as recited in claim 18, wherein said longitudinal axis of said second plateau portion is disposed farther away from said track than said longitudinal axis of said first plateau portion.

20. The mechanism as recited in claim 19, wherein said second guide groove further comprises a second ramp portion interconnecting said second end of said first plateau portion and an end of said second plateau portion.

21. The mechanism as recited in claim 20, wherein said stop late further comprises disengaging means for disengaging said first pin from said notch while said first pin simultaneously tracks said second guide groove and said first guide groove.

22. The mechanism as recited in claim 21, wherein said disengaging means comprises at least part of said portions of said stop plate defining said first guide groove.

23. The mechanism as recited in claim 22, wherein said disengaging means comprises an intermediate ramp section of said first guide groove for, during sliding movement of said slide plate toward said stop plate, raising said first pin from said first position to a second position by:
 a) disengaging said first pin from said notch; and
 b) driving said first pin up said first ramp portion to said first end of said first plateau portion.

24. The mechanism as recited in claim 23, wherein said firs guide groove has a horizontal section on which said first pin, engaged in said notch, is driven, during sliding movement of said slide plate away from said stop plate, while said first pin simultaneously tracks said second guide groove and said first guide groove.

25. The mechanism as recited in claim 24, wherein said intermediate ramp section has a proximal end connected to said horizontal section of said first guide groove, and a distal end disposed closer than said proximate end to said closed end of said first guide groove.

26. The mechanism as recited in claim 25, wherein:
 a) said intermediate ramp section of said first guide groove is further for driving said first pin, during sliding movement of said slide plate toward said stop plate, from said first end of said first plateau portion to said second end of said first plateau portion; and
 b) said first guide groove further comprises a curved section, connected to said distal end of said intermediate ramp section, for driving said first pin from said second end of said first plateau portion up said second ramp portion, during said sliding movement of said slide plate toward said stop plate, thereby raising said first pin from said second position to a third position.

27. The mechanism as recited in claim 12, wherein:

(a) said stop plate comprises means for arresting sliding movement of said slide plate at a predetermined location; and
 (b) the location of said stop plate can be changed along said track.

28. The mechanism as recited in claim 27, wherein said means for arresting sliding movement comprises said closed end of said first guide groove.

29. The mechanism as recited in claim 28, wherein said means for a resting sliding movement further comprises said other portions of said first pin entering into and exiting from said first guide groove.

30. The mechanism as recited in claim 12, wherein said slide plate has potions defining a third guide groove having a closed first end and a closed second end.

31. The mechanism as recited in claim 38, wherein said longitudinal axis of said track is generally parallel to a longitudinal axis of said third guide groove.

32. The mechanism as recited in claim 31, further comprising a second pin mounted on said lift arm, said second pin having portions projecting through said second guide groove so that said second pin tracks said third guide groove during sliding movement of said slide plate and so that said lift arm pivots with respect to said slide plate around said second pin.

33. The mechanism as recited in claim 35, further comprising means for suppressing vertical movement of said lift arm from said slide plate in said track of said housing.

34. The mechanism as recited in claim 33, wherein said means for suppressing lateral movement of said slide plate in said track of said housing comprises a lash spring.

35. The mechanism as recited in claim 34, further comprising means for holding said lash spring in position, said means for holding said lash spring in position comprising said first pin and said second pin.

36. The mechanism as recited in claim 35, further comprising means for suppressing vertical movement of said lift arm from said slide plate in said track of said housing.

37. The mechanism as recited in claim 36, wherein said means for suppressing vertical movement of said lift arm from said slide plate in said track of said housing comprises said lash spring.

38. The mechanism as recited in claim 35, further comprising means for suppressing vertical movement of said slide plate from said track.

39. The mechanism as recited in claim 38, wherein said means for suppressing vertical movement of said slide plate from said track comprises said lash spring.

* * * * *